(12) United States Patent
Gorumkonda

(10) Patent No.: US 10,140,774 B2
(45) Date of Patent: Nov. 27, 2018

(54) ENVIRONMENT AWARE COLOR VISUALIZATION

(71) Applicant: Amazon Technologies, Inc., Seattle, WA (US)

(72) Inventor: Gurunandan Krishnan Gorumkonda, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/640,932

(22) Filed: Jul. 3, 2017

(65) Prior Publication Data
US 2017/0301143 A1    Oct. 19, 2017

Related U.S. Application Data

(63) Continuation of application No. 14/797,658, filed on Jul. 13, 2015, now Pat. No. 9,734,635.

(51) Int. Cl.
| | |
|---|---|
| *G06T 19/00* | (2011.01) |
| *G06T 11/00* | (2006.01) |
| *H04N 5/232* | (2006.01) |
| *G06T 7/00* | (2017.01) |
| *G06T 7/20* | (2017.01) |
| *G06T 7/90* | (2017.01) |

(52) U.S. Cl.
CPC ........... *G06T 19/006* (2013.01); *G06T 7/004* (2013.01); *G06T 7/20* (2013.01); *G06T 7/90* (2017.01); *G06T 11/001* (2013.01); *H04N 5/23229* (2013.01); *H04N 5/23293* (2013.01); *G06T 2207/10024* (2013.01); *G06T 2207/30244* (2013.01)

(58) Field of Classification Search
CPC ............. G09G 5/02; G09G 2320/0666; G06T 15/506; H04N 1/6086
See application file for complete search history.

(56) References Cited

U.S. PATENT DOCUMENTS

| | | |
|---|---|---|
| 8,773,433 B1 | 7/2014 | Smyrl |
| 9,734,635 B1 * | 8/2017 | Gorumkonda ........ G06T 19/006 |

(Continued)

OTHER PUBLICATIONS

U.S. Appl. No. 14/797,658, filed Jul. 13, 2015, Notice of Allowance dated Apr. 12, 2017.

(Continued)

*Primary Examiner* — Antonio A Caschera
(74) *Attorney, Agent, or Firm* — Thomas Horstemeyer, LLP; Michael J. D'Aurelio; Jason M. Perilla

(57) ABSTRACT

A device is used to present the visualization of color on a display based on various environmental factors. In one embodiment, an image of an environment is captured using at least one sensor, where the image includes a surface area in the environment. A relative position of a source of light in the environment is also identified with respect to the surface area. Color is rendered for the surface area in the image on the display based on the relative position of the source of light and a bidirectional reflectance distribution function (BRDF) associated with the color, among other factors. In some cases, the movement of a computing device can be tracked, and color on the display adjusted based at least in part on the movement. The color can also be rendered based on a display profile of the display and other parameters.

20 Claims, 10 Drawing Sheets

(56) References Cited

U.S. PATENT DOCUMENTS

2008/0158239 A1     7/2008  Lamy et al.
2013/0271625 A1*  10/2013  Gruber ............... H04N 5/23212
                                                        348/239

OTHER PUBLICATIONS

U.S. Appl. No. 14/797,658, filed Jul. 13, 2015, Response to Final Office Action dated Dec. 27, 2016.
U.S. Appl. No. 14/797,658, filed Jul. 13, 2015, Final Office Action dated Dec. 27, 2016.
U.S. Appl. No. 14/797,658, filed Jul. 13, 2015, Response to Non-Final Office Action dated Aug. 16, 2016.
U.S. Appl. No. 14/797,658, filed Jul. 13, 2015, Non-Final Office Action dated Aug. 16, 2016.

* cited by examiner

ENVIRONMENT AWARE COLOR VISUALIZATION

CROSS-REFERENCE TO RELATED APPLICATIONS

This application is a continuation of U.S. patent application Ser. No. 14/797,658, filed Jul. 13, 2015, the entire disclosure of which is hereby incorporated herein by reference.

BACKGROUND

A wide array of colors and finishes are available from paint manufacturers and retailers. When choosing a color of paint for a room, for example, individuals may rely upon color swatches from stores, paint samples, and other color references to identify the desired color. Because such a wide array of paint colors and finishes are available, it is often necessary to travel to a store that sells paint, narrow the choice of colors to a set of color swatches, examine the color swatches in a room or environment to be painted, and apply one or more paint samples in the room before a color can be selected. In some cases, if the first color selected is not acceptable after painting a larger area in a room, it can be necessary to begin the color selection process over before settling upon a final color.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
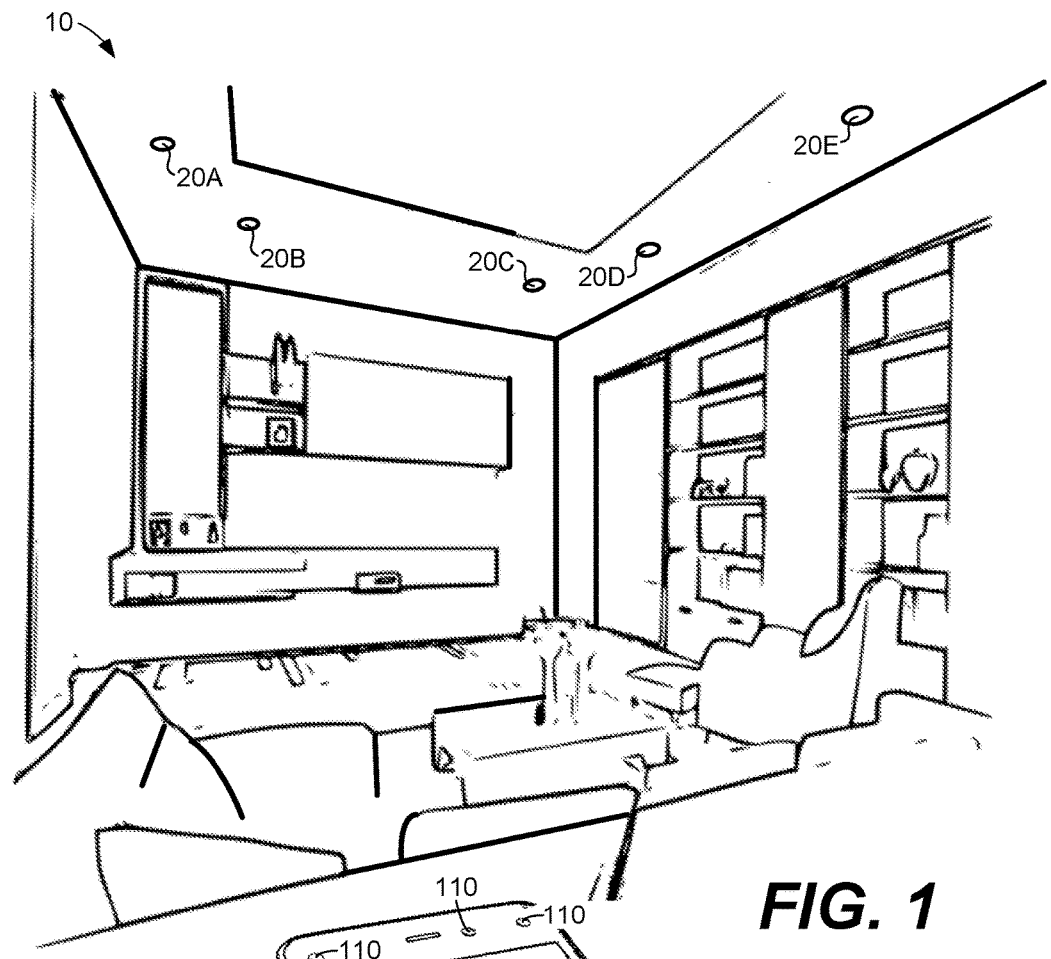
FIG. 1 illustrates an environment and computing device for environment aware color visualization according to various example embodiments described herein.

As noted above, a wide array of colors and finishes are available from paint manufacturers and retailers. Individuals may rely upon color swatches and paint samples, for example, to help identify which color to choose when painting walls, furniture, or other areas or items. The selection of a desirable color, however, is often complicated by various factors, such as differences in lighting intensity and color, differences in viewing angle, and variations in reflectance based on viewing angle, among other factors that can vary over time in an environment. Due to these and other factors, the color of a swatch can appear different at one time and place as compared to another. For similar reasons, the color of a paint might appear different once placed on a wall at home, for example, as compared to how that color appears on the color swatch for the paint in the store.

Further, although the color shown on a paper swatch will appear to vary based on the environment where the paper swatch is located, the color provided by a display of a computing device might not vary (or vary in the same way) based on the environment where the display is located. Thus, this presents a challenge in providing representative examples of colors available for purchase from paint manufacturers and retailers using displays of computing devices, because the colors shown on the displays might not be representative of the environment in which the devices are located.

To more accurately render color on a display of a device based on the environment in which the device is present, the embodiments described herein render the color in view of certain environmental factors, such as the lighting type and distribution in the environment and the viewing angle of the viewer of the device. For example, if an individual selects a color of paint and wishes to see the color on a display of a smart phone, the smart phone can collect information about the surrounding environment and render the color on that basis. The color can then be rendered more accurately on the display of the smart phone and, as aspects of the environment vary over time, dynamically updated.

To determine the factors from which a more accurate representation of color can be rendered, the smart phone or other device can capture a distribution of lighting in the environment using a light or image sensor. Further, the smart phone can determine a viewing angle of a viewer with respect to the display of the phone. Based on the distribution of lighting and the viewing angle, among other factors, the color of the paint can be rendered on the display using a reflectance distribution function for the paint and display properties of the display. Also, as noted above, if the smart phone is moved (e.g., tilted, transported, etc.) over time, it can recapture and/or recalculate the factors and adjust the display of the color accordingly.

The concepts described herein can be used to more accurately render colors for stains, fabrics, papers, and other materials and items. The concepts can help individuals see how colors and/or textures, for example, will appear in various environments, without the need to obtain actual samples, saving time and frustration. Also, individuals can make final decisions more confidently knowing that they have had the opportunity to examine colors under various conditions.

In the context outlined above, various environment aware color visualization concepts and embodiments are described herein. To help illustrate and explain the concepts, FIG. 1 illustrates an environment 10 having light sources 20A-20E and a computing device 100 for environment aware color visualization. As shown in FIG. 1, the computing device 100 includes imaging devices 110 (e.g., cameras) and a display 112. Although the computing device 100 is illustrated as a smartphone in FIG. 1, other types of computing devices consistent with those described below can be used to implement the concepts of environment aware color visualization.

For visual reference by an individual, the computing device 100 renders and displays a color in an area 30 on the display 112. According to aspects of the embodiments described herein, the color in the area 30 is rendered for display by the computing device 100 based on factors present in the environment 10. That is, if the color were displayed in the area 30 without using the environment aware color visualization concepts described herein, then the color would be displayed without taking into consideration any of the factors in the environment 10, such as the color (i.e., the constituent wavelengths of the light), positions, and intensity of the light sources 20A-20E. As another example, the color in the area 30 would be displayed without taking into consideration the viewing angle of the individual looking at the display 112. Because the brightness, color reproduction, and/or other visual parameters of the display 112 can vary based on the angle at which it is viewed, the color in the area 30 on the display 112 can appear to vary if the viewing angle is not accounted for. Thus, using the environment aware color visualization concepts described herein, the color in the area 30 is more representative of what the color would actually look like in the environment 10. In various embodiments, the area 30 can be larger or smaller than that depicted in FIG. 1.

Among other processes performed by the computing device 100 to render the color in the area 30, the computing device 100 can capture a distribution of lighting in the environment 10 using at least one sensor, such as the cameras 110. The computing device 100 can identify relative positions of one or more of the light sources 20A-20E with respect to the display 112 of the computing device 100 using the cameras 110. Further, the computing device 100 can gauge an intensity and/or color of one or more of the light sources 20A-20E. This position, intensity, and light color information can be used to adjust the color displayed in the area 30 and provide a more accurate rendering of the color as it would appear in the environment 10. More particularly, in the context of colors of paint, for example, the computing device 100 can provide a more accurate rendering of the color as it would appear printed on paper or a wall in the environment 10.

Further, the computing device 100 can determine a viewing angle of the individual viewing the computing device 100 using the cameras 110. The computing device 100 can determine the viewing angle of the individual with respect to the display 112 of the device. In some embodiments, the computing device 100 renders the color in the area 30 based on a combination of the distribution of lighting in the environment 10 and the viewing angle of the individual using the computing device 100. Still further, in some embodiments, the computing device 100 renders the color with reference to a bidirectional reflectance distribution function (BRDF) associated with the color, properties of the medium (e.g., paint finish, paint quality, etc.) from which the color is applied, and/or display properties of the display 112. The display properties of the display 112 can define changes in colors and intensities of colors based on viewing angle, among other properties.

Using the concepts of environment aware color visualization presented herein, a color of paint can be rendered on a display of a computing device in a way that is more representative how that color would actually look in various environments. The color can also be updated or adjusted dynamically over time based on changes in the environment or tailored based on user-defined environmental conditions. The concepts can be extended to rendering colors on one or more surface areas in an image of an environment. That is, after an image of a room, for example, is captured, colors can be rendered on one or more surface areas in the image based on the distribution of lighting in the room and the viewing angle of the individual using the computing device that generates the rendering. Additionally, the concepts can be extended to rendering stain finishes, fabrics, various textures of papers, and other items and surfaces.

Using the concepts described herein, individuals can inspect representative example paint colors, for example, available for purchase from paint manufacturers and retailers using displays of computing devices. Further, the concepts reduce or eliminate the need to rely upon paint swatches and samples, saving time, cost, and frustration.

Figure 2:
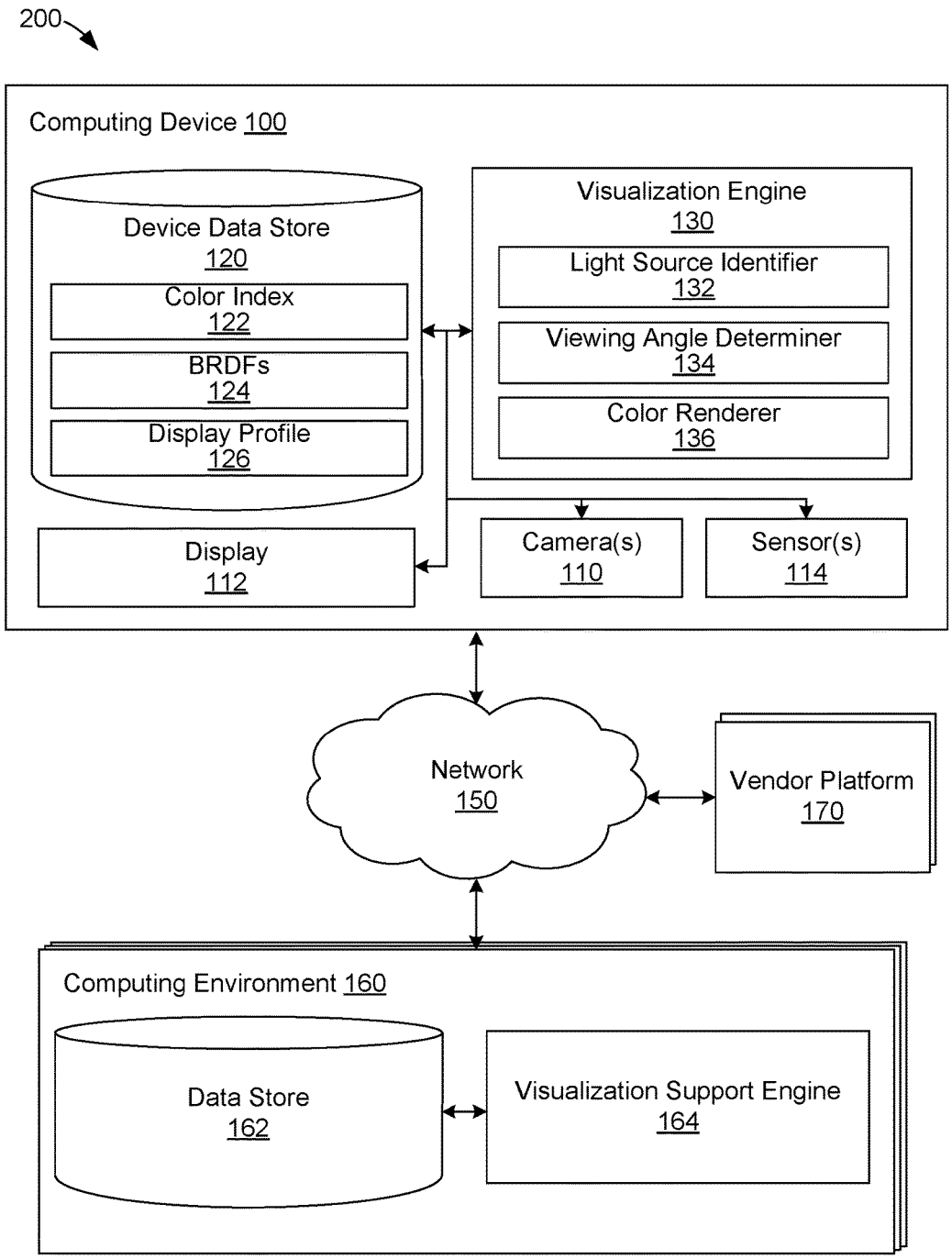
FIG. 2 illustrates a networked environment for environment aware color visualization according to various example embodiments described herein.

Turning to a more detailed description of the computing device 100 shown in FIG. 1, FIG. 2 illustrates a networked environment 200 including the computing device 100. In addition to the computing device 100, the networked environment 200 includes the network 150, the computing environment 160, and the vendor platform 170.

Before turning to the detailed description of the computing device 100, the network 150, the computing environment 160, and the vendor platform 170 are described. The computing environment 160 can be embodied as one or more computers, computing devices, or computing systems. In certain embodiments, the computing environment 160 can include one or more computing devices arranged, for example, in one or more server or computer banks. The computing device or devices can be located at a single installation site or distributed among different geographical locations. The computing environment 160 can include a plurality of computing devices that together embody a hosted computing resource, a grid computing resource, and/or other distributed computing arrangement.

Among other components, the computing environment 160 includes the data store 162 and the visualization support engine 164. The data store 162 can store data for reference by the computing device 100. For example, the data store 162 can store color index, BRDF, and display profile data, for example, among other data for reference by the computing device 100. Similarly, the visualization support engine 164 can provide processing support for the computing device 100. In some embodiments, at least a portion of the processing performed by the computing device 100 for environment aware color visualization can be performed by the visualization support engine 164. In other embodiments, all the processing performed by the computing device 100 for environment aware color visualization can be performed by the visualization support engine 164, based on images and other sensor data obtained by the computing device 100 and communicated to the computing environment 160 over the network 150.

In one embodiment, the computing environment 160 can also operate, at least in part, as an electronic marketplace or storefront. In that sense, the computing environment 160 can render various network pages related to the sale of items including colors of paint, stain, fabrics, papers, etc. In that context, a user of the computing device 100 can browse colors of paint or other items for sale through the electronic marketplace and render the colors using the concepts of environment aware color visualization described herein.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. It is noted that the computing environment 160 can communicate with the computing device 100 and the vendor platform 170 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as website servers, file servers, networked computing resources, databases, data stores, or any other network or computing architectures.

The vendor platform 170 can be embodied as one or more computers, computing devices, or computing systems of product manufacturers. In certain embodiments, the vendor platform 170 can be similar in composition to the computing environment 160, including one or more computing devices arranged, for example, in one or more server or computer banks.

The computing device 100 and/or the computing environment 160 can access data hosted by the vendor platform 170, such as BRDF, display profile, or other data. For example, if the vendor platform 170 is hosted by a paint manufacturer, the computing device 100 may be able to access the vendor platform 170 to identify both a color of paint and associated BRDF for the paint, so that a representative color of the paint can be rendered on the display 112 of the computing device 100. The vendor platform 170 can also operate, at least in part, as an electronic marketplace or storefront. In that sense, the vendor platform 170 can render various network pages related to various items for sale by one or more manufacturers.

Turning to the computing device 100, it can be embodied as a combination of memory, circuitry, and/or processors capable of performing the processes for environment aware color visualization described herein. The computing device 100 can be embodied as any type of computing or processing device or system, including those embodied in the form of a desktop computer, a laptop computer, a personal digital assistant, a cellular telephone, a tablet computer, a digital camera, or wearable computing devices, among others. Examples of wearable computing devices include smart watches, wristbands, and wearable heads-up display computing devices, such as smart glasses, virtual-reality headsets, etc. Beyond those described in more detail below, the computing device 100 can include one or more system or subsystem devices, such as wireless communications transceivers, GPS receivers, biometric sensors, speakers, the display 112, etc. The computing device 100 can also include one or more peripheral system or subsystem devices. In this context, the peripheral devices can include one or more input devices, output devices, sensors, etc., such as a bar or quick response (QR) code scanner, a keyboard, keypad, touch pad, touch screen, microphone, the imaging devices 110 (e.g., cameras), and one or more sensors, etc.

The display 112 of the computing device 100 can be embodied as any type of display screen, such as a liquid crystal display (LCD), light-emitting diode (LED) display, or organic light-emitting diode (OLED) display, among other types of displays, regardless of resolution, refresh rate, the incorporation of three-dimensional features, heads-up displays, etc. The display screen 112 can incorporate a capacitive touch input sensor, to provide an input device for the computing device 100. As described in further detail below, the computing device 100 stores and references a display profile associated with the display 112. The display profile can be referenced by the computing device 100 to compensate, at least in part, for the hardware-, software-, and manufacturing-specific color and/or brightness response of the display 112.

The imaging devices 110 (e.g., cameras) can be embodied as any type of complementary metal-oxide semiconductor (CMOS), charge-coupled device (CCD), or other type of image sensor. The cameras 110 can incorporate other image-capture subsystems, such as focus, zoom, flash, and other subsystems. Among the embodiments, the cameras 110 can be arranged in various configurations. For example, while the computing device 100 is illustrated in FIG. 1 with five cameras 110 arranged in a type of rectangle, other computing devices that incorporate the concepts described herein can rely upon other numbers and arrangements of cameras. In that context, one or more of the cameras 110 can be arranged in a triangle, circle, or other configuration or placed on the sides, top, bottom, back, or other positions about the housing of the computing device 100. Because of the spatial separation between the cameras 110, the computing device 100 can compare images taken from different cameras to detect depth and generate image-based three-dimensional reconstructions of the environment. It is also noted that, although the computing device 100 is illustrated in FIG. 1 with five cameras 110, one or more of those cameras can be dedicated for uses exclusive to environment aware color visualization. Similarly, one or more of the cameras 110 can be used for processes and features in addition to environment aware color visualization.

As also shown in FIG. 2, the computing device 100 includes one or more sensors 114. The sensors 114 can be embodied as one or more micro- or nano-electromechanical system (NEMS or MEMS) or other type of accelerometer, gyroscope, orientation sensor, or motion sensor. The sensors 114 can also include height, altitude, infrared, or thermal sensors, among other types of sensors. The sensors 114 can provide signals representative of the orientation and/or movement of the computing device 100. These signals can be used by the computing device 100 to identify the relative positions of light sources and track the movement and/or orientation of the computing device 100 over time, for example, so that adjustments to the display of colors can be more accurate and dynamic over time. The sensors 114 can also include one or more sensors, such as three-dimensional laser, structured light, modulated light, radar, or light-based radar (e.g., LiDAR) sensors, among others, used to generate three-dimensional reconstructions of the environment.

In FIG. 2, a representative diagram of data and logical components for environment aware color visualization in the computing device 100 is also illustrated. Among other components, the computing device 100 includes a device data store 120 and a visualization engine 130. The device data store 120 includes a color index 122, a set of BRDFs 124, and a display profile 126. The visualization engine 130 includes a light source identifier 132, a viewing angle determiner 134, and a color renderer 136.

The color index 122 includes an index of colors available for selection and display by a user of the computing device 100. For example, the color index 122 can include an index of colors of paint, stain, paper, fabric, or other items for sale. As described in further detail below, a user of the computing device 100 can browse the color index 122 to select a desired color, and the visualization engine 130 can render the selected color for display on the display 112 based on factors in the environment of the computing device 100. In other embodiments, the index of colors in the color index 122 can be hosted in the computing environment 160 and/or the vendor platform 170. Thus, the computing device 100 is capable of rendering colors with reference to a database of colors accessed remotely through the network 150.

The BRDFs 124 include bidirectional reflectance distribution functions for one or more of the colors in the color index 122. The BRDFs 124 can include respective bidirectional reflectance distribution functions for individual ones of the colors in the color index 122. Additionally, the BRDFs 124 can include one or more bidirectional reflectance distribution functions for a set of the colors in the color index 122. One or more of the BRDFs 124 can be embodied as a function that defines how light is reflected at a surface, including surfaces that reflect light having various colors. In addition to the BRDFs, the device data store 120 can store one or more spatially varying bidirectional reflectance distribution functions (SVBRDFs) to define a BRDF that varies according to surface location and bidirectional texture functions (BTFs) for modeling surfaces that are not flat and might cause scattering effects such as shadowing or masking. Any of these functions can be referenced by the visualization engine 130 for rendering colors according to the concepts described herein.

Figure 3A:
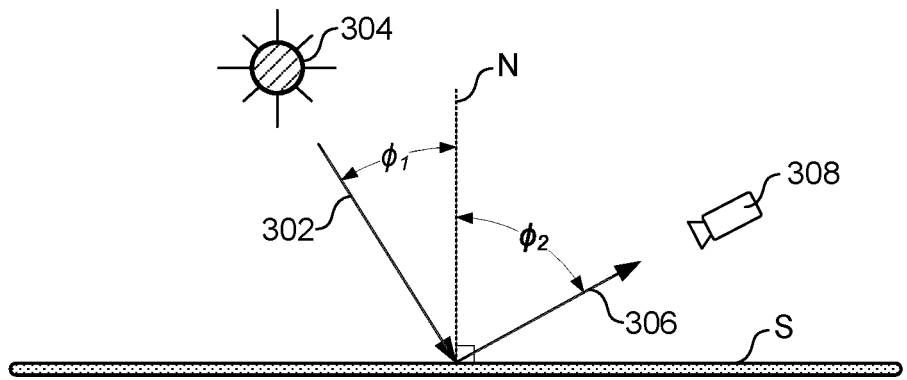
FIGS. 3A and 3B illustrate representative diagrams related to bidirectional reflectance distribution functions according to various example embodiments described herein.
Figure 3B:
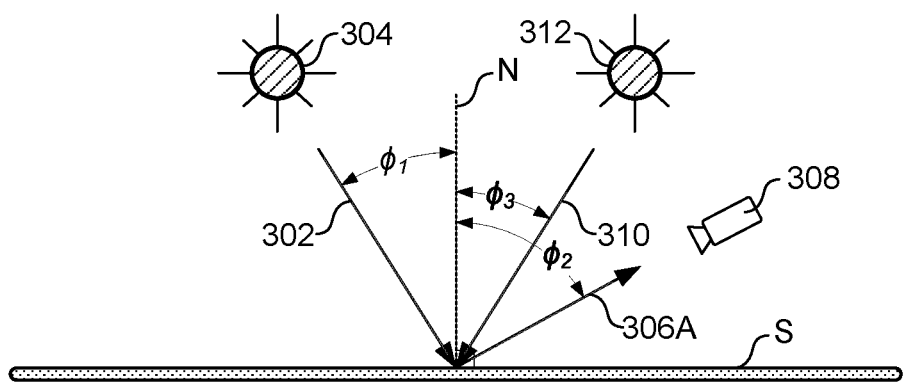

For additional context, FIGS. 3A and 3B illustrate representative diagrams related to BRDFs according to various example embodiments described herein. Referring to FIG. 3A, a BRDF 124 can be embodied as a function of a direction $\phi_1$ of incoming light 302 generated by a light source 304 and direction $\phi_2$ of outgoing light 306 toward a viewpoint 308. The coordinate system of the BRDF 124 function can be related to a normal "N" of the surface "S" off which the incoming light 302 is reflected. For example, a BRDF 124 can return a ratio of reflected radiance of the outgoing light 306 as compared to the irradiance incident on the surface "S" from the incoming light 302 based on the directions $\phi_1$ and $\phi_2$. In any given BRDF 124, the directions $\phi_1$ and $\phi_2$ can be defined using any suitable coordinate system and recognize directions in two or three dimensions.

Further, a BRDF 124 can be evaluated for more than one source of light, as shown in FIG. 3B. Particularly, because the surface "S" in FIG. 3B is the same as that in FIG. 3A, the same BRDF 124 evaluated in FIG. 3A can be evaluated for the outgoing light 306A in FIG. 3B. In FIG. 3B, the outgoing light 306A is a composite of the function of the direction $\phi_1$ of the incoming light 302 and the direction $\phi_2$ of the outgoing light 306A toward the viewpoint 308, as well as a function of a direction $\phi_3$ of incoming light 310 from a light source 312 and the direction $\phi_2$ of the outgoing light 306A.

It is noted that any given BRDF 124 of a paint, for example, can vary from that of another paint based on differences in the color, type, finish, material composition, and other properties of the paint. Thus, as described above, the BRDFs 124 include bidirectional reflectance distribution functions for one or more of the colors in the color index 122. The BRDFs 124 can include respective bidirectional reflectance distribution functions for individual ones of the colors in the color index 122. Additionally, the BRDFs 124 can include one or more bidirectional reflectance distribution functions for a set of the colors in the color index 122.

Referring back to the computing device 100 in FIG. 2, the display profile 126 can be embodied as a profile that describes the color space, brightness, and other display characteristics of the display 112. The display profile 126 can be defined according to certain display profile standards, such as those promulgated by the International Color Consortium (ICC), for example, among other standards bodies. If the computing device 100 includes more than one display, the device data store 120 can store display profiles for each of the displays or the display profile 126 can be a combined profile for multiple displays.

To generate the display profile 126, the manufacturer of the display 126 can calibrate it (or one similar to it) during or just after manufacture to identify its brightness, color attributes and response, color space, etc. The display profile 126 can characterize the brightness, color attributes and response, color space, etc. of the display 112 by mapping a target color response of the display 112 to a profile connection or color space. The profile connection or color space can be a color space defined by the International Commission on Illumination (CIE), such as a L*a*b*, XYZ, RGB, or other color space. The mappings can be specified using tables or any other suitable data structure, using interpolation, or using a series of parameters, functions or transformations. The display profile 112 can be obtained and/or updated over time through the network 150. For example, the computing device 100 can obtain an updated or revised version of the display profile 112 from the computing environment 160 or the vendor platform 170, for example.

Although manufacturers often provide display profiles for displays, the accuracy of any given display profile can depend on more than the manufacturing process and specifications used to make it. Thus, in some cases, it can be better to generate or regenerate a display profile under the conditions where the display is used. In other words, because the performance of the display 112 can change based on factors such as temperature, age, use, stress, etc., the display profile 126 can be generated by testing the display 112 at any time after the computing device 100 is assembled. There are various ways to generate a display profile for the display 112, such as using a hardware calibrator to measure output levels at various locations on the display 112 to adjust color and gamma curves, for example.

As noted above, the visualization engine 130 includes the light source identifier 132. The light source identifier 132 can capture a distribution of lighting in an environment using at least one sensor of a device, such as one or more of the cameras 110 and/or the sensors 114. More particularly, the light source identifier 132 can identify a relative position one or more sources of light in an environment using the cameras 110 or the sensors 114. The light source identifier 132 can also gauge an intensity and/or a color of the one or more sources of light.

Figure 4A:
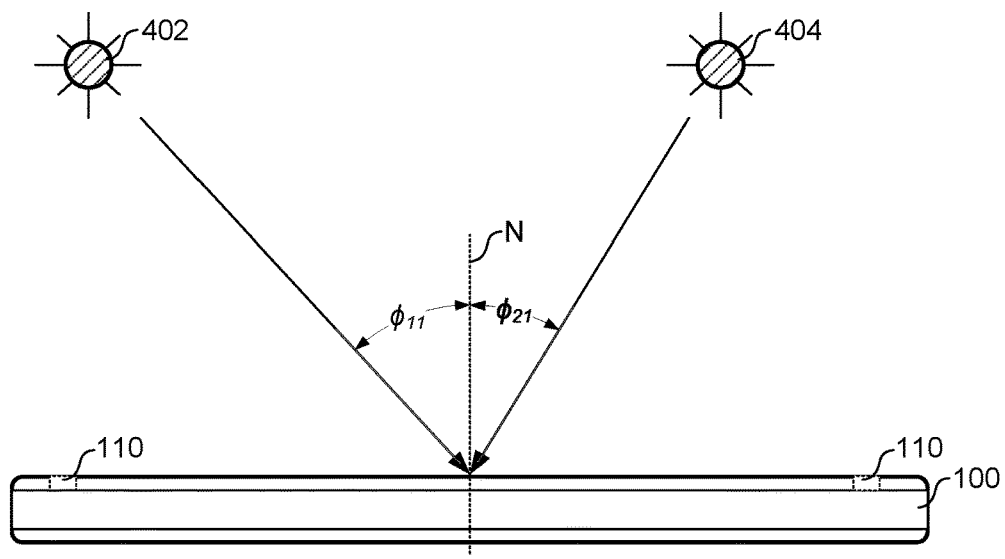
FIGS. 4A and 4B illustrate representative diagrams related to capturing a distribution of lighting in an environment according to various example embodiments described herein.
Figure 4B:
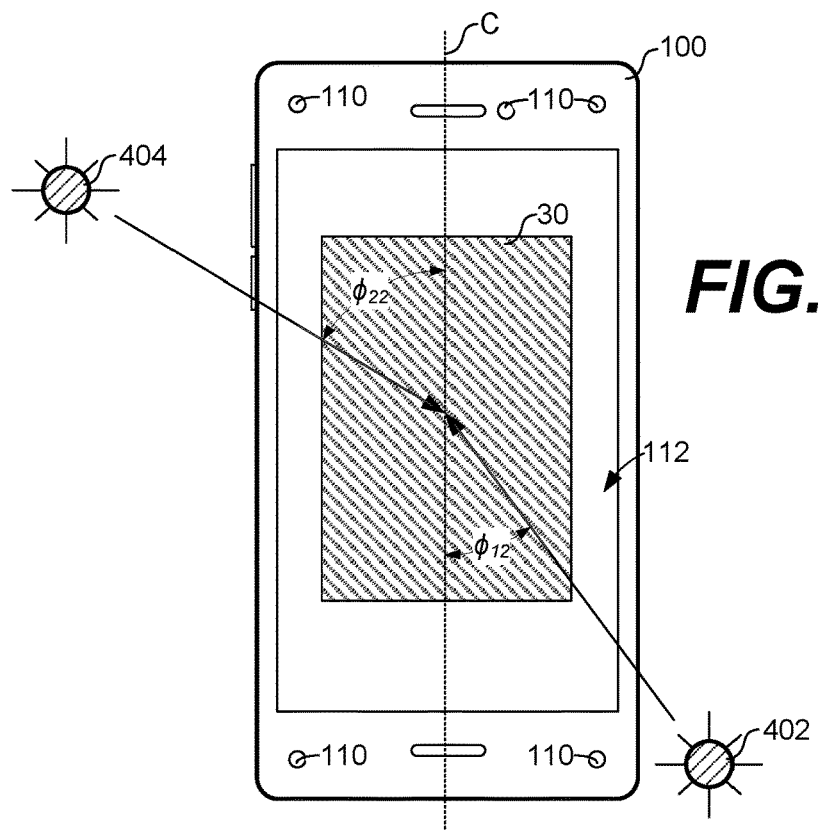

For additional context, FIGS. 4A and 4B illustrate representative diagrams related to capturing a distribution of lighting in an environment according to various example embodiments described herein. By capturing and comparing images taken by one or more of the cameras 110, the light source identifier 132 can identify positions of both sources of light 402 and 404, as shown in FIGS. 4A and 4B. For example, from images captured by the cameras 110, the light source identifier 132 can identify the positions of both sources of light 402 and 404 based on the positions or directions of areas of brightness in the images. The light source identifier 132 can identify positions of light sources from one or more images taken by a single camera 110. Additionally or alternatively, if any two of the cameras 110 are positioned at separated locations on the front of the computing device 100, the light source identifier 132 can compare images captured by two or more of the cameras 110 to estimate positions of the sources of light 402 and 404 based on differences in the location and intensity of bright areas in the images. The light source identifier 132 can also identify positions of lights using sensors other than image sensors, such as using light or other suitable sensors.

The positions of the sources of light 402 and 404 can be identified relative to the computing device 100, relative to each other and the computing device 100, or relative to any other suitable frame of reference. In one embodiment, when the computing device 100 displays a color in the area 30 on the display 112, the light source identifier 132 calculates the positions of the sources of light 402 and 404 relative to a center or approximate center of the area 30.

The positions of the sources of light 402 and 404 can be defined using a coordinate system related to a normal "N" of a top surface of the computing device 100, a center line "C" of the top surface of the computing device 100, or both. In the example in FIGS. 4A and 4B, the positions of the sources of light 402 and 404 can be defined with reference to an angle of incidence of light with respect to a surface of the display 112 of the computing device 100, related to the normal "N" and/or the center line "C". That is, the position of the light source 402 can be defined by the angles of incidence $\phi_{11}$ and $\phi_{12}$, and the position of the light source 404 can be defined by the angles of incidence $\phi_{21}$ and $\phi_{22}$. However, it is noted that positions of sources of light can be defined by the light source identifier 132 using any suitable coordinate system, absolute or relative, in one or multiple dimensions, without limitation.

The light source identifier 132 can also present instructions on a user interface of the computing device 100 that direct a user to tilt, rotate, or move the computing device 100 when capturing the distribution of lighting. In that context, the light source identifier 132 can rely upon motion and orientation feedback from the sensors 114 to help capture and/or verify the distribution of lighting.

As noted above, the light source identifier 132 can also gauge an intensity of the sources of light 402 and 404. In one embodiment, the intensity of the sources of light 402 and 404 can be determined by the light source identifier 132 using images taken by one or more of the cameras 110 at different levels of sensor gain, exposure time, etc. Similar to high-dynamic range (HDR) imaging, a group of images taken at different levels of exposure can be taken to extend the dynamic range and granularity of the image sensors used in the cameras 110. In other embodiments, the light source identifier 132 can determine an intensity of the sources of light 402 and 404 using images taken by two or more of the cameras 110. In still other cases, the light source identifier 132 can determine an intensity of the sources of light 402 and 404 using a single image taken by one or more of the cameras 110. The intensity of light sources can be determined with reference to one or more predetermined reference thresholds, for example, or based on any suitable absolute or relative references of brightness.

The light source identifier 132 can also gauge a color of the sources of light 402 and 404 individually, as a composite, or both individually and as a composite. For example, because images captured by the cameras 110 include data representative of the wavelengths of light emitted from the sources of light 402 and 404, the light source identifier 132 can gauge the color or constituent wavelengths of the lights. The light source identifier 132 can compare data in the images captured by the cameras 110 to a set of expected colors of light, such as daylight, fluorescent, halogen, incandescent, or other expected light sources. In some cases, the light source identifier 132 can associate a type of light source or bulb (e.g., fluorescent, halogen, incandescent, etc.) when data in an image falls within a range of expected data for the type of bulb. In other cases, the visualization engine 130 can generate a user interface to identify or confirm the type or types of lights in an environment.

Figure 5A:
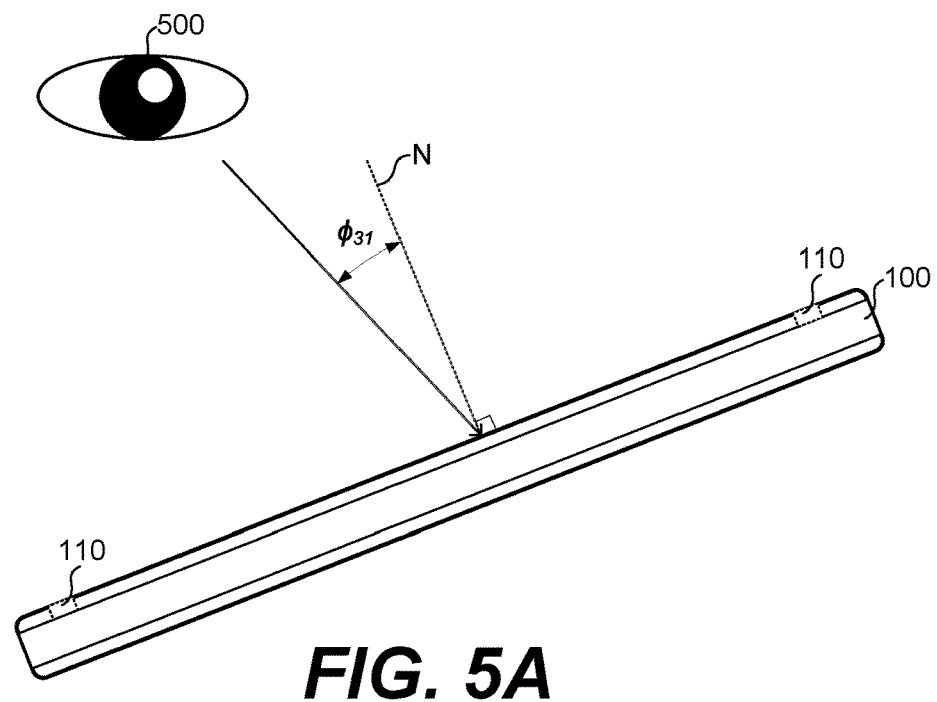
FIGS. 5A and 5B illustrate representative diagrams related to determining a viewing angle according to various example embodiments described herein.
Figure 5B:
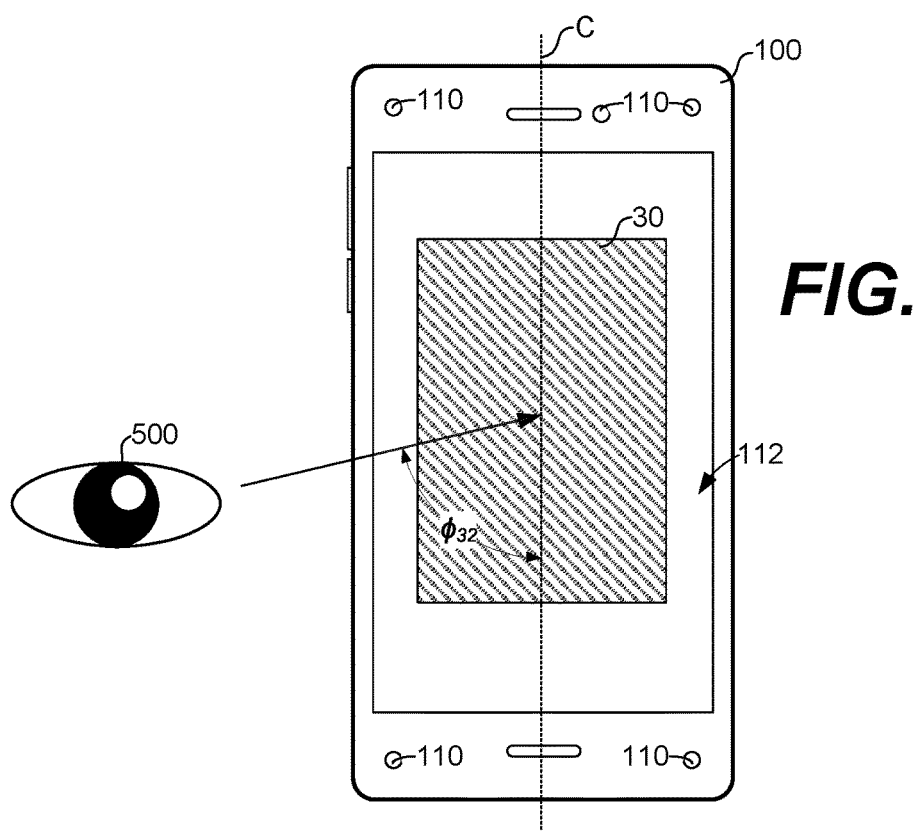

The visualization engine 130 also includes the viewing angle determiner 134. The viewing angle determiner 134 can determine a viewing angle of a viewer with respect to the display 112 of the computing device 100 using the cameras 110 and/or the sensors 114. For additional context, FIGS. 5A and 5B illustrate representative diagrams related to determining a viewing angle according to various example embodiments described herein. By capturing and comparing images taken by one or more of the cameras 110, the viewing angle determiner 134 can identify a position of a viewer 500 (or one or both eyes of the viewer 500) as shown in FIGS. 5A and 5B. Referencing images captured by the cameras 110, the viewing angle determiner 134 can first use facial and/or eye recognition to identify the eyes of the viewer 500 and then calculate a relative position of the eyes with respect to the display 112.

The position the viewer 500 can be defined using a coordinate system related to a normal "N" of a top surface of the computing device 100, a center line "C" of the top surface of the computing device 100, or both. In the example in FIGS. 5A and 5B, the positions of the viewer 500 can be defined according to a viewing angle with respect to a surface of the display 112 of the computing device 100. That is, the viewing angle can be defined by the angles $\phi_{31}$ and $\phi_{32}$, related to the normal "N" and/or the center line "C". However, it is noted that the viewing angle of the viewer 500 can be defined by the viewing angle determiner 134 using any suitable coordinate system, absolute or relative, in one or multiple dimensions, without limitation.

Figure 6:
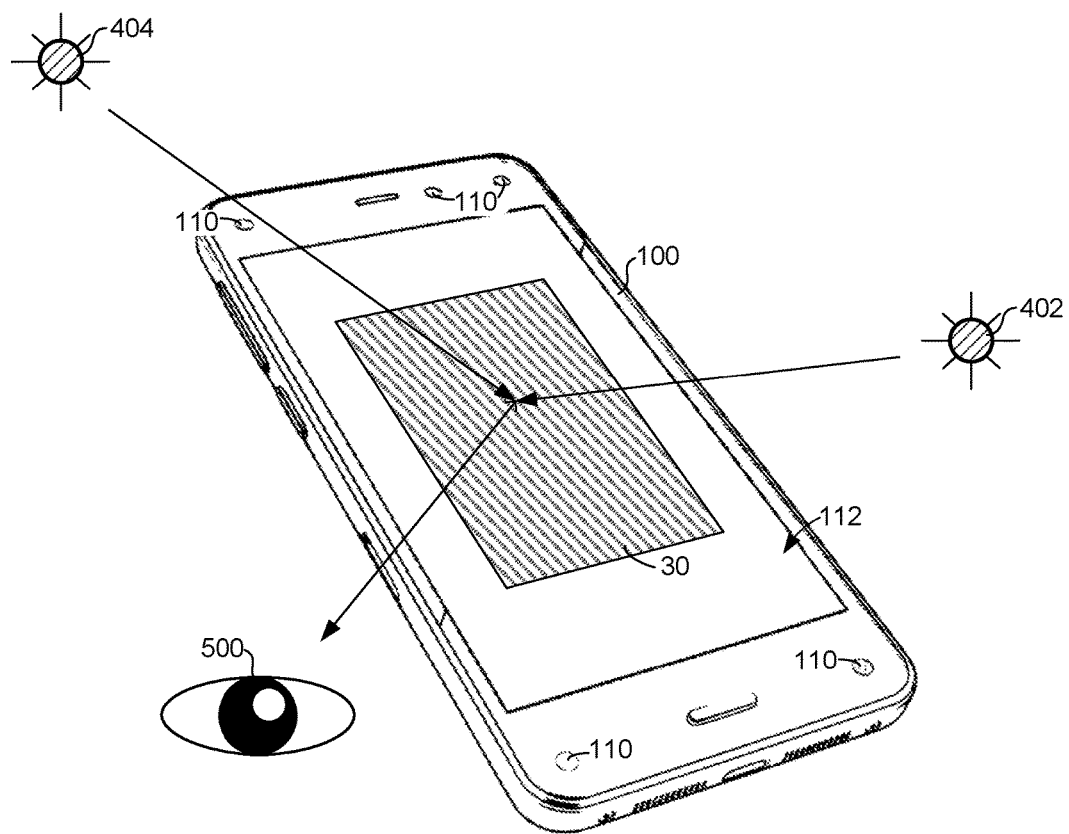
FIG. 6 illustrates a representative diagram related to rendering a color in an area on a display of a computing device according to various example embodiments described herein.

Finally, the visualization engine 130 includes the color renderer 136. The color renderer 136 can render one or more colors in an area on the display 112 of the computing device 100 based on the distribution of lighting and the viewing angle of a viewer in an environment of the computing device 100. In that context, FIG. 6 illustrates a representative diagram related to rendering a color in the area 30 on the display 112 of the computing device 100. Particularly, in FIG. 6, the color renderer 136 renders color in the area 30 based on the relative locations, light intensities, light colors, angles of incidence, etc. of the sources of light 402 and 404 and the viewing angle of the viewer 500.

It is noted that the color renderer 136 can render any color selected by a user (e.g., the viewer) of the computing device 100, such as any of the colors in the color index 122. Once selected, the color renderer 136 can render the color based on the relative locations, light intensities, light colors, angles of incidence, etc. of the sources of light 402 and 404 and the viewing angle of the viewer 500, as determined by the light source identifier 132 and the viewing angle determiner 134. Additionally, the color renderer 136 can render the color based on information from the light source identifier 132 and the viewing angle determiner 134 with reference to the BRDF 124 associated with the selected color and the display profile 126 of the display 112.

It is noted that the color renderer 136 can render the color in the area 30 based on the information determined by the light source identifier 132, the information determined by the viewing angle determiner 134, or both. As for the information determined by the light source identifier 132, the color renderer 136 can evaluate the BRDF 124 associated with the selected color as a function of the directions of incoming light from the sources of light 402 and 404 and the direction of outgoing light toward the viewer 500, consistent with the description provided above with reference to FIGS. 3A and 3B. As for the information determined by the viewing angle determiner 134, the color renderer 136 can use this information to evaluate the BRDF 124. The color renderer 136 can also use it to evaluate an accurate display of the color using a series of parameters, functions or transformations in the display profile 126 based on the viewing angle of the viewer 500.

Thus, according to aspects of environment aware color visualization described herein, the color renderer 136 can perform certain types of color and/or brightness correction on the display 112 based on factors in the environment of the computing device 100. In that context, based on the information determined by the light source identifier 132 and/or the viewing angle determiner 134, the color renderer 136 can apply one or more weighting factors to color components in a color model for the display 112 with or without reference to the BRDF 124 associated with the color. Further, the color renderer 136 can apply other weighting factors to color components based on the viewing angle of the viewer 500 with reference to the display profile 126 of the display 112. With regard to the viewing angle of the viewer 500, for example, or other factors, the visualization engine 130 can generate and display a color reproduction accuracy limit error or error message on the display 112. For example, if the viewing angle of the viewer 500 becomes too extreme for a suitable level of accuracy in color reproduction on the display 112, the visualization engine 130 can generate and display a color reproduction accuracy limit error or error message.

As described in further detail below, the color renderer 136 can also update or dynamically adjust color in the area 30 on the display 112 over time based on changes in the environment. Further, the color renderer 136 can update or dynamically adjust color in the area 30 on the display 112 based on user-defined environmental conditions, such as lighting conditions. The concepts can also be extended to rendering colors on one or more surface areas in an image captured by the computing device 100. For example, after an image of a room is captured by the computing device 100, colors can be rendered on one or more surface areas, such as walls or countertops, in the image based on the distribution of lighting in the room and the viewing angle of the individual using the computing device 100.

Figure 7:
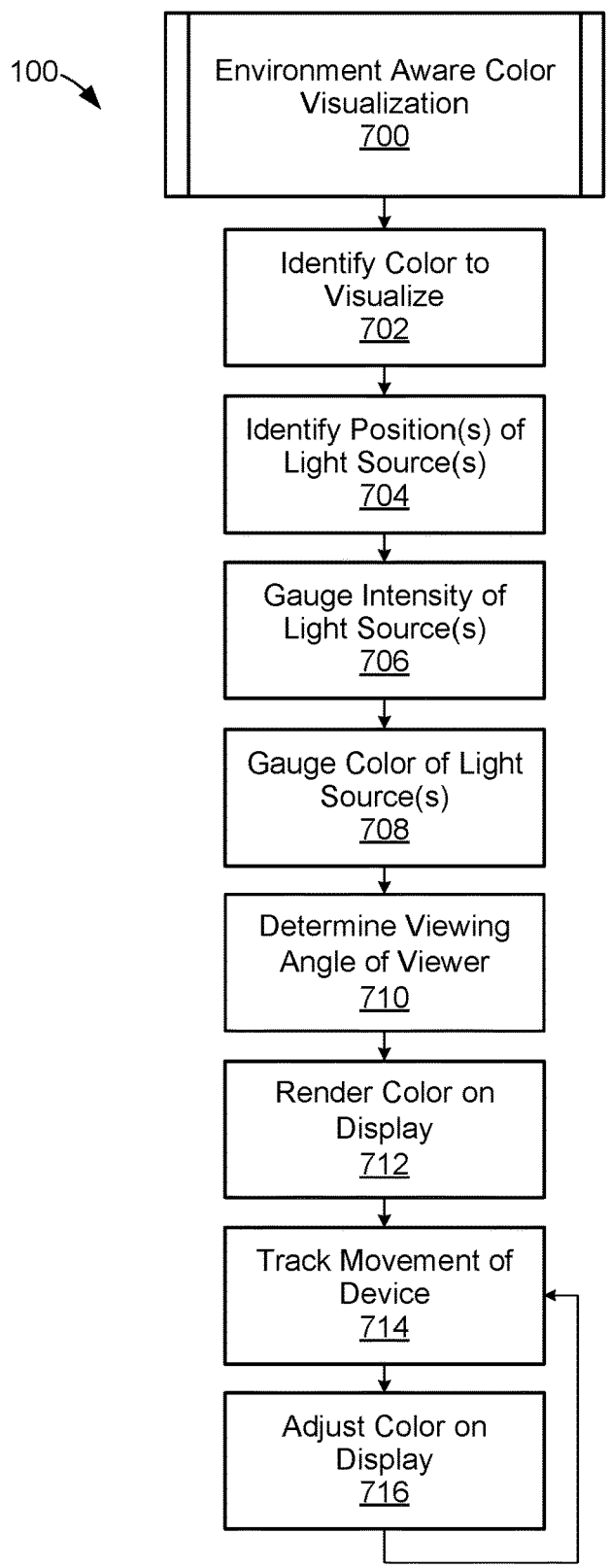
FIG. 7 illustrates a process of environment aware color visualization performed by the computing device shown in FIG. 2 according to an example embodiment described herein.

FIG. 7 illustrates a process 700 of environment aware color visualization performed by the computing device 100 shown in FIG. 2 according to an example embodiment described herein. In certain aspects, the process flowchart in FIG. 7 can be viewed as depicting an example set of steps performed in the computing device 100, without or without assistance from the computing environment 160, according to one or more embodiments. The flowchart in FIG. 7 provides merely one example of a functional sequence or arrangement of steps that can be employed to implement the operations of environment aware color visualization described herein. Further, although the process 700 is described in connection with the computing device 100, other computing devices, including the computing environment 160, can perform the process 700. Also, it should be appreciated at the outset that the identification of light sources, the determination of positions, intensities, and colors of light sources, and the determination of the viewing angle of a viewer, among other types of environmental factors described below, can be determined and identified by the computing device 100 as estimates or likelihoods of such factors. In other words, at least to some extent and in some embodiments, estimates of environmental factors can be relied upon for color rendering.

At reference numeral 702, the process 700 includes identifying a color, paint, or other item having a color to visualize. For example, a user of the computing device 100 can browse among colors of paint, stain, fabrics, papers, etc. in the color index 122 using any suitable user interface on the computing device 100. As in other examples, the user of the computing device 100 can browse among items for sale on the computing environment 160 and/or the vendor platform 170. Once a color of paint or other item is selected, the process proceeds to reference numeral 704.

At reference numeral 704, the process 700 includes capturing a distribution of lighting in an environment of the computing device 100. Capturing the distribution of lighting can include one or more of identifying an absolute or relative position of one or more sources of light in an environment of the computing device 100. In that context, the light source identifier 132 can capture the distribution of light using the cameras 110 and/or the sensors 114 according to any of the techniques described above with reference to FIGS. 4A and 4B. For example, positions of one or more sources of light can be identified relative to the computing device 100, relative to each other and the computing device 100, or relative to any other suitable frame of reference. Further, the positions can be defined with reference to an angle of incidence of light to a surface of the display 112 of the computing device 100.

At reference numeral 706, the process 700 includes the computing device 100 gauging an intensity of the one or more sources of light identified at reference numeral 704. As noted above, the intensity of sources of light can be determined by the light source identifier 132 using images taken by one or more of the cameras 110 at different levels of sensor gain, exposure time, etc., similar to those taken for HDR. A group of images at different levels of exposure can be taken to extend the dynamic range and granularity of the image sensors used in the cameras 110. The intensity of light sources can be determined with reference to one or more predetermined reference thresholds, for example, or based on any suitable absolute or relative references of brightness.

At reference numeral 708, the process 700 includes the computing device 100 gauging a color of the one or more sources of light identified at reference numeral 704. The light source identifier 132 can gauge a color of one or more sources of light individually, as a composite, or both individually and as a composite. Because images captured by the cameras 110 include data representative of the wavelengths of light emitted from sources of light, the light source identifier 132 can gauge the color or constituent wavelengths of the lights. The light source identifier 132 can compare data in the images to a set of expected colors of light, such as daylight, fluorescent, halogen, incandescent, or other expected light sources. In some cases, the light source identifier 132 can associate a type of light source or bulb (e.g., fluorescent, halogen, incandescent, etc.) when data in an image falls within a range of expected data for the type of bulb. In other cases, the visualization engine 130 can generate a user interface to identify or confirm the type or types of lights in an environment.

At reference numeral 710, the process 700 includes the computing device 100 determining a viewing angle of a viewer. In that context, the viewing angle determiner 134 can determine a viewing angle of a viewer according to any of the techniques described above with reference to FIGS. 5A and 5B. For example, referencing images captured by the cameras 110, the viewing angle determiner 134 can first use facial and/or eye recognition to identify the eyes of a viewer and then calculate a relative position of the eyes with respect to the display 112. The position of the viewer can be defined using a coordinate system related to a surface of the display 112 of the computing device 100. However, the viewing angle of the viewer can be defined using any suitable coordinate system, absolute or relative, in one or multiple dimensions, without limitation.

At reference numeral 712, the process 700 includes the computing device 100 rendering color in an area on the display 112 based on one or more of the distribution of lighting determined at reference numerals 704, 706, and 708 and the viewing angle determined at reference numeral 710. Here, the color renderer 136 can render the color selected or identified at reference numeral 702. As for the distribution of lighting and viewing angle information, the color renderer 136 can evaluate the BRDF 124 associated with the selected color as a function of the directions of incoming light and the direction of outgoing light toward the viewer. The color renderer 136 can also use the viewing angle determined at reference numeral 710 to evaluate an accurate display of color using a series of parameters, functions or transformations in the display profile 126 based on the viewing angle.

Thus, according to aspects of environment aware color visualization described herein, the color renderer 136 can perform certain types of color and/or brightness correction on the display 112 based on factors in the environment of the computing device 100. In that context, based on the information determined by the light source identifier 132 and/or the viewing angle determiner 134, the color renderer 136 can apply one or more weighting factors to color components in a color model for the display 112 with or without reference to the BRDF 124 associated with the color. Further, the color renderer 136 can apply other weighting factors to color components based on a viewing angle of a viewer with reference to the display profile 126 of the display 112.

At reference numeral 714, the process 700 includes tracking movement of the computing device 100. Here, the computing device 100 can use one or more of the sensors 114 to track the movement and/or orientation of the computing device 100 over time. Further, at reference numeral 716, the process 700 includes the color renderer 136 adjusting the color rendered on the display 112 of the computing device 100 based on the movement tracked at reference numeral 714.

It is noted that, because moving or tilting the computing device 100 can result in a change in the orientation of the normal "N" and/or the center line "C" of the computing device 100, the directions of light from light sources and/or the viewing angle of the viewer of the computing device 100 can also change. Thus, to adjust the color rendered on the display 112 at reference numeral 714, one or both of the light source identifier 132 and the viewing angle determiner 134 can recalculate one or more of the distribution of lighting determined at reference numerals 704, 706, and 708 and the viewing angle determined at reference numeral 710. The recalculation can be performed using environment data previously captured and stored by the device during the processes at reference numerals 704, 706, 708, and 710, new environment data captured by the cameras 110 and/or the sensors 114, or a combination of previous and new data. In turn, the color renderer 136 can update the color rendered on the display 112 using the recalculated distribution of lighting and/or viewing angle information.

Thus, the color rendered on the display 112 can be updated or adjusted dynamically over time based on changes in the position and/or orientation of the computing device 100. The color rendered on the display 112 can also be updated or adjusted dynamically over time based on changes in the environment of the computing device 100. In other words, the processes at reference numerals 704, 706, 708, and 710 can proceed continuously or at predetermined intervals over time. Thus, if changes in lighting, for example, occur in the environment of the computing device 100 over time, adjustments to the color rendered on the display 112 can also be updated or adjusted over time.

Additionally, the color rendered on the display 112 can be generated or updated based on user-specified parameters and conditions. For example, a user may specify an environment defined by an arrangement of one or more lights, a type or color of the lights, a particular viewing angle, and other environmental conditions. In that case, rather than (or in addition to) the computing device 100 identifying and determining environmental conditions, the process 700 can include a user of the computing device 100 providing user-defined parameters or factors for a user-defined environment. In turn, the process 700 can include rendering color in an area on the display 112 based on the user-defined environment.

Figure 8:
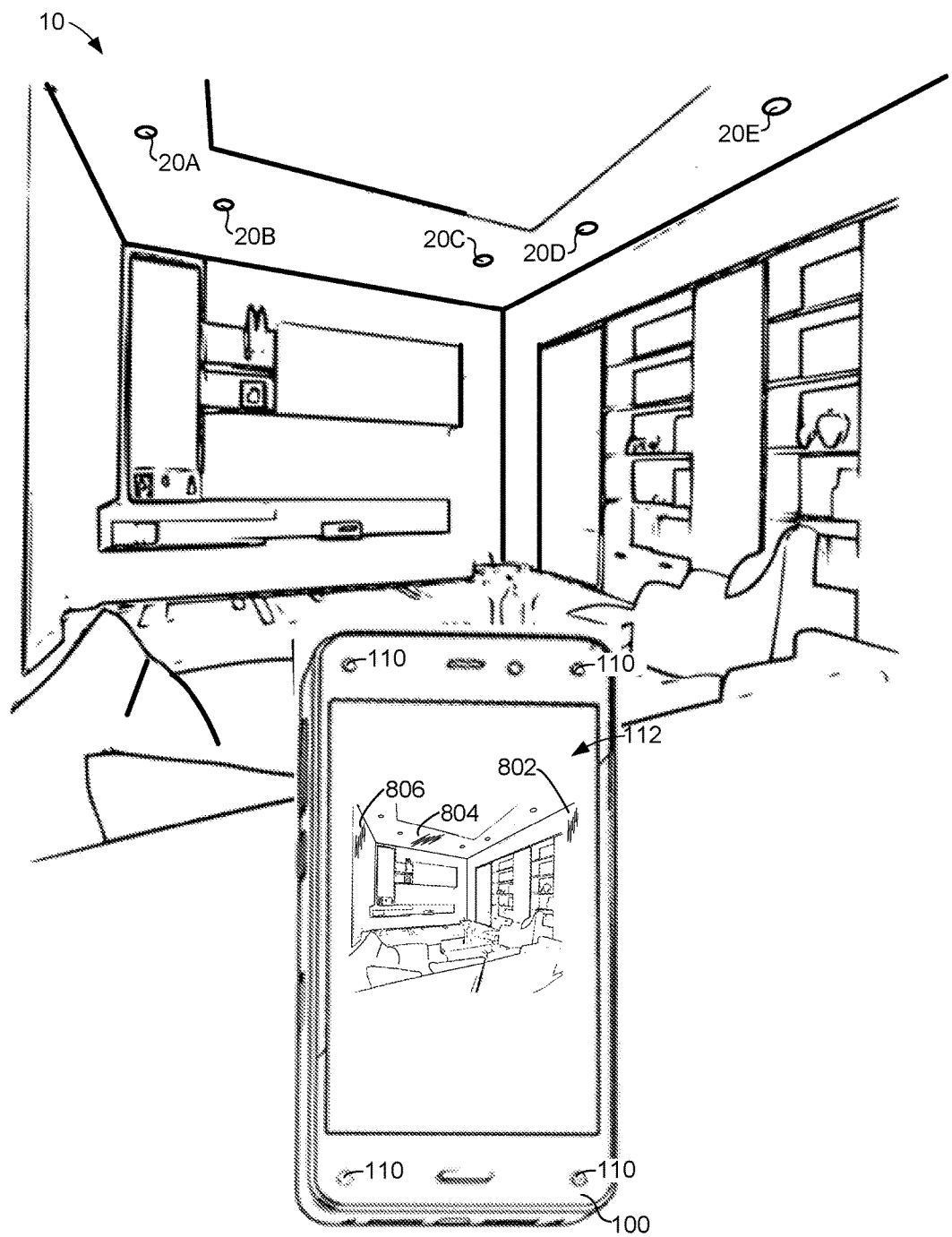
FIG. 8 illustrates the environment and computing device shown in FIG. 1 according to another example embodiment of environment aware color visualization described herein.

As noted above, the concepts of environment aware color visualization can be extended to rendering colors on one or more surface areas in an image captured by the computing device 100. In that context, FIG. 8 illustrates the environment 10 and computing device 100 according to another example embodiment of environment aware color visualization described herein. In FIG. 8, rather than displaying the area 30, as shown in FIG. 1, the computing device 100 captures and displays an image of the environment 10 on the display 112. The image of the environment 10 on the display 112 can be captured by a rear-facing camera of the computing device 100 and includes surfaces 802, 804, and 806, for example. The surfaces 802, 804, and 806 may correspond to walls in the environment 10. In this embodiment, rather than displaying color in the area 30, as shown in FIG. 1, the computing device 100 renders color on the surfaces 802, 804, and 806, individually, using the concepts of environment aware color visualization described herein. It is noted that the surfaces 802, 804, and 806 are provided by way of example, and the embodiments described herein can apply color visualization to other surfaces in an image of the environment 10 and other environments.

Figure 9:
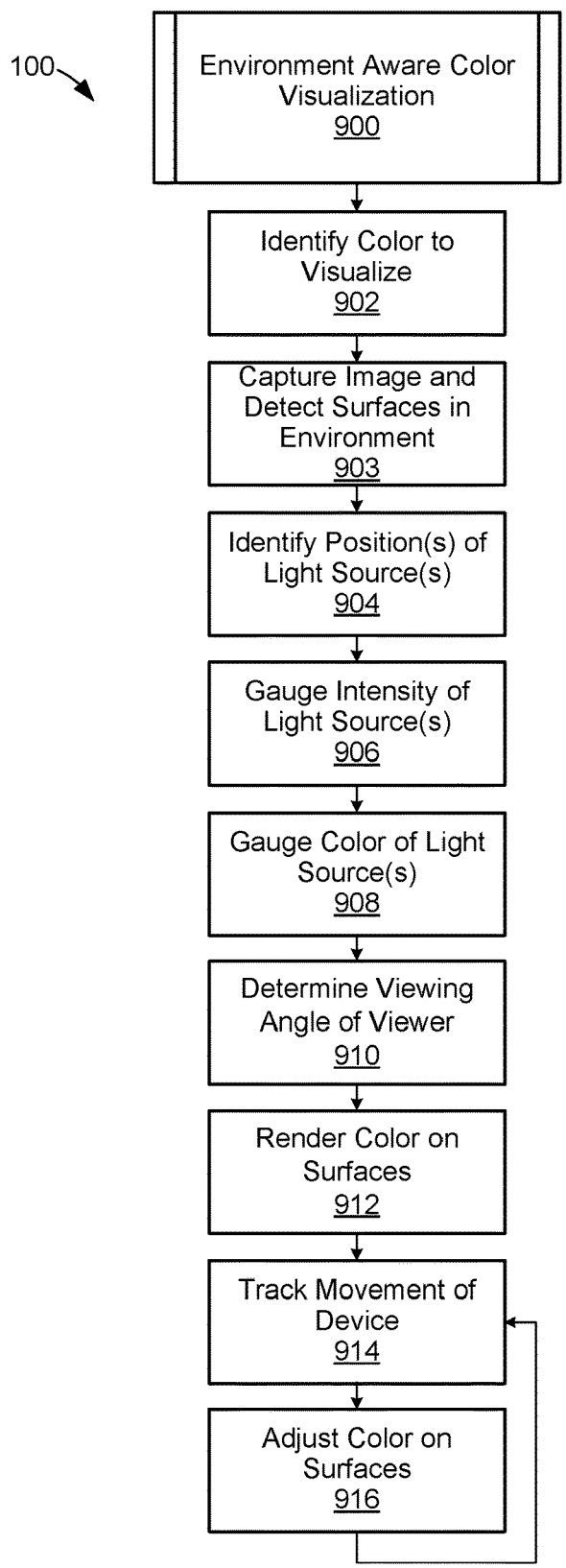
FIG. 9 illustrates another process of environment aware color visualization performed by the computing device shown in FIG. 2 according to an example embodiment described herein.

Thus, after an image of an environment is captured by the computing device 100, colors can be rendered on one or more surface areas, such as walls or countertops, in the image based on the distribution of lighting in the room and the viewing angle of the individual using the computing device 100. In that context, FIG. 9 illustrates another process 900 of environment aware color visualization performed by the computing device 100. At the outset, it is noted that the primary difference between the process 700 in FIG. 7 and the process 900 in FIG. 9 is that the process 900 is performed so as to render colors on surfaces in an image captured by the computing device 100 rather than rendering colors in the area 30 on the display 112. In other words, while the process 700 can be helpful to visualize the color of paint on a paper swatch in various environments, for example, the process 900 can be helpful to visualize the color of that paint on surfaces in a room. Further, rather than simply adding color to surfaces in the image, the color is rendered on the surfaces to provide an accurate estimate of the color based on the lighting in the environment and the viewing angle of the viewer.

At reference numeral 902, the process 900 includes identifying a color, paint, or other item having a color to visualize in a manner that can be similar to that described above at reference numeral 702 in FIG. 7. For example, a user of the computing device 100 can browse among colors of paint, stain, fabrics, papers, etc. in the color index 122 using any suitable user interface on the computing device 100. As in other examples, the user of the computing device 100 can browse among items for sale on the computing environment 160 and/or the vendor platform 170. Once a color of paint or other item is selected, the process proceeds to reference numeral 903.

At reference numeral 903, the process 900 includes capturing an image using one or more of the cameras 110 of the computing device 100 and detecting one or more surfaces in the environment of the image. For example, as shown in FIG. 8, the image of the environment 10 can be captured by a rear-facing camera of the computing device 100. After the image is captured, the visualization engine 130 of the computing device 100 can detect one or more surfaces, such as the surfaces 802, 804, and 806 in the image of the environment 10. The surfaces can be detected using any suitable image processing techniques, such as performing edge and/or depth detection, for example. In some embodiments, the surfaces can be detected, confirmed, or further defined with the assistance of information gathered from the sensors 114, such as from three-dimensional laser, structured light, modulated light, radar, or light-based radar sensors. In that context, capturing an image can also include determining a three-dimensional representation of the environment 10, to assist with surface detection.

The processes at reference numerals 904, 906, 908, and 910 are similar to those described above with reference to FIG. 7 at reference numerals 704, 706, 708, and 710, respectively. However, rather than identifying and defining the positions, intensities and colors of light sources, such as the light sources 20A-20E, with reference to an angle of incidence of light on a surface of the display 112, the light source identifier 132 can identify and define the positions, intensities and colors with respect to angles of incidence of light on one or more of the surfaces 802, 804, and 806, individually or in any combination. The light source identifier 132 can refer to the image of the environment 10 as well as any other three-dimensional representation of the environment 10 to identify the angles of incidence. Further, rather than (or in addition to) identifying and defining a viewing angle of a viewer with reference to an angle of incidence on a surface of the display 112, the viewing angle determiner 134 can determine one or more viewing angles with respect to one or more of the surfaces 802, 804, and 806, individually or in any combination. The viewing angle determiner 134 can also refer to the image of the environment 10 as well as any other three-dimensional representation of the environment 10 to identify the viewing angle.

At reference numeral 912, the process 900 includes the computing device 100 rendering color on the surfaces 802, 804, and 806 on the display 112. The color can be rendered by the color renderer 136 based on one or more of the distribution of lighting for the surfaces 802, 804, and 806 determined at reference numerals 904, 906, and 908 and the viewing angle for the surfaces 802, 804, and 806 determined at reference numeral 910. As for the distribution of lighting and viewing angle information, the color renderer 136 can evaluate the BRDF 124 associated with the selected color individually or collectively for the surfaces 802, 804, and 806 as a function of the directions of incoming light and the viewing angle for the surfaces 802, 804, and 806, individually or collectively. The color renderer 136 can also use the viewing angle of the display 112 determined at reference numeral 910 to evaluate the display of color for the surfaces 802, 804, and 806 using a series of parameters, functions or transformations in the display profile 126 based on the viewing angle.

Finally, the processes at reference numerals 914 and 916 are similar to those described above with reference to FIG. 7 at reference numerals 714 and 716, respectively. Thus, according to aspects of environment aware color visualization described herein, the color renderer 136 can help visualize colors on the surfaces 802, 804, and 806 in an image on the display 112 based on factors in the environment of the computing device 100.

Figure 10:
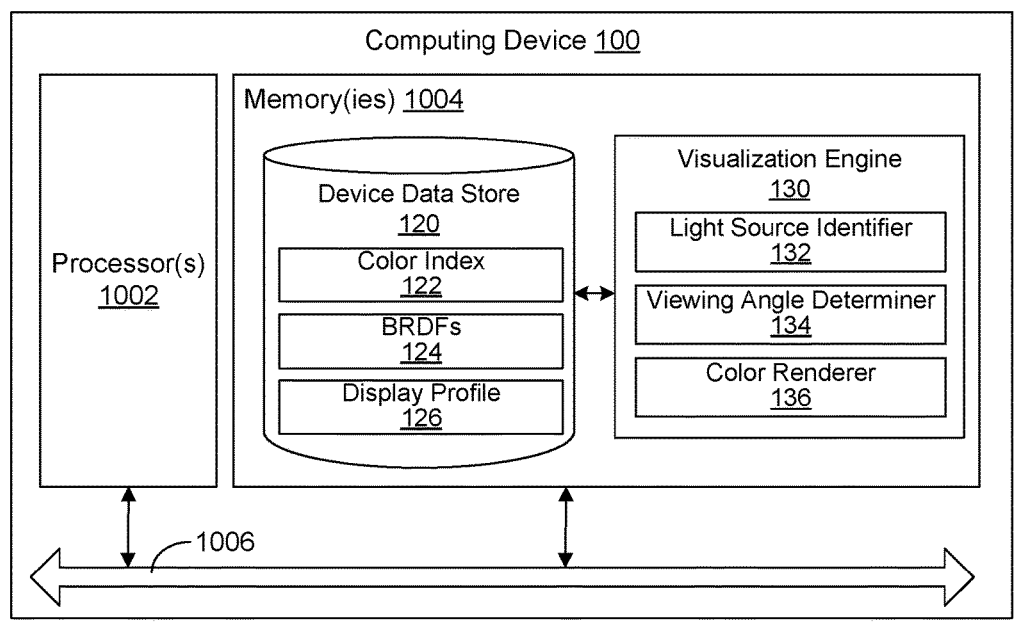
FIG. 10 illustrates an example schematic block diagram of the computing device shown in the networked environment of FIG. 2 according to various embodiments described herein.

FIG. 10 illustrates an example schematic block diagram of the computing device 100 shown in the networked environment of FIG. 2 according to various embodiments described herein. The computing device 100 includes at least one processing system, for example, having a processor 1002 and a memory 1004, both of which are electrically and communicatively coupled to a local interface 1006. The local interface 1006 can be embodied as a data bus with an accompanying address/control bus or other addressing, control, and/or command lines.

In various embodiments, the memory 1004 stores data and software or executable-code components executable by the processor 1002. For example, the memory 1004 can store executable-code components associated with the visualization engine 130 for execution by the processor 1002. The memory 1004 can also store data such as that stored in the device data store 120, among other data.

It is noted that the memory 1004 can store other executable-code components for execution by the processor 1002. For example, an operating system can be stored in the memory 1004 for execution by the processor 1002. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 1004 stores software for execution by the processor 1002. In this respect, the terms "executable" or "for execution" refer to software forms that can ultimately be run or executed by the processor 1002, whether in source, object, machine, or other form. Examples of executable programs include, for example, a compiled program that can be translated into a machine code format and loaded into a random access portion of the memory 1004 and executed by the processor 1002, source code that can be expressed in an object code format and loaded into a random access portion of the memory 1004 and executed by the processor 1002, or source code that can be interpreted by another executable program to generate instructions in a random access portion of the memory 1004 and executed by the processor 1002, etc.

An executable program can be stored in any portion or component of the memory 1004 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 1004 can include both volatile and nonvolatile memory and data storage components. Volatile components are those that do not retain data values upon loss of power. Nonvolatile components are those that retain data upon a loss of power. Thus, the memory 1004 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 1002 can be embodied as one or more processors 1002 and the memory 1004 can be embodied as one or more memories 1004 that operate in parallel, respectively, or in combination. Thus, the local interface 1006 facilitates communication between any two of the multiple processors 1002, between any processor 1002 and any of the memories 1004, or between any two of the memories 1004, etc. The local interface 1006 can include additional systems designed to coordinate this communication, including, for example, a load balancer that performs load balancing.

As discussed above, the visualization engine 130 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIGS. 7 and 9 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 1002. The machine code can be converted from the source code, etc. Further, each block can represent, or be connected with, a circuit or a number of interconnected circuits to implement a certain logical function or process step.

Although the flowchart or process diagrams in FIGS. 7 and 9 illustrate a specific order, it is understood that the order can differ from that which is depicted. For example, an order of execution of two or more blocks can be scrambled relative to the order shown. Also, two or more blocks shown in succession in FIGS. 7 and 9 can be executed concurrently or with partial concurrence. Further, in some embodiments, one or more of the blocks shown in FIGS. 7 and 9 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the visualization engine 130 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 7 and 9. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying computer-readable instructions thereon that, when executed by at least one computing device, directs the at least one computing device to perform a method comprising:
   capturing an image of an environment using at least one sensor, at least one surface area in the image corresponding to at least one surface area in the environment;
   identifying a relative position of at least one source of light in the environment with respect to the at least one surface area in the environment using the at least one sensor;
   rendering color for the at least one surface area in the image on a display based at least in part on the relative position of the at least one source of light in the environment with respect to the at least one surface area in the environment, a bidirectional reflectance distribution function (BRDF) associated with the color, and an application of a weighting factor to at least one color component in a color model for the display;
   tracking movement of the at least one computing device; and
   adjusting the color on the display based at least in part on the movement.

2. The non-transitory computer-readable medium of claim 1, wherein identifying the relative position of the at least one source of light in the environment with respect to the at least one surface area in the environment comprises determining an angle of incidence of light from the at least one source of light in the environment on the at least one surface area in the environment.

3. The non-transitory computer-readable medium of claim 1, wherein the method further comprises:
   gauging an intensity of the at least one source of light in the environment;
   gauging a color of the at least one source of light in the environment; and
   rendering the color on the display for the at least one surface area in the image based at least further in part on the intensity and the color of the at least one source of light in the environment.

4. The non-transitory computer-readable medium of claim 1, wherein rendering the color on the display further comprises rendering the color by applying a weighting factor to a plurality of color components in a color model for the display.

5. A system, comprising:
   a memory device to store computer-readable instructions thereon; and
   at least one computing device configured, through execution of the computer-readable instructions, to:
      capture an image of an environment using at least one sensor, at least one surface area in the image corresponding to at least one surface area in the environment;
      identify a relative position of at least one source of light in the environment with respect to the at least one surface area in the environment using the at least one sensor; and
      render color for the at least one surface area in the image on a display based at least in part on the relative position of the at least one source of light in the environment with respect to the at least one surface area in the environment, a bidirectional reflectance distribution function (BRDF) associated with the color, and an application of a weighting factor to at least one color component in a color model for the display.

6. The system of claim 5, wherein, to render the color on the display, the at least one computing device is further configured to apply a weighting factor to a plurality of color components in a color model for the display.

7. The system of claim 5, wherein, to identify the relative position of the at least one source of light in the environment with respect to the at least one surface area in the environment, the at least one computing device is further configured to determine an angle of incidence of light from the at least one source of light in the environment on the at least one surface area in the environment.

8. The system of claim 5, wherein the at least one computing device is further configured to:
   gauge an intensity of the at least one source of light in the environment; and
   gauge a color of the at least one source of light in the environment.

9. The system of claim 8, wherein the at least one computing device is configured to render the color on the display for the at least one surface area in the image based further in part on the intensity and the color of the at least one source of light in the environment.

10. The system of claim 8, wherein the at least one computing device is further configured to adjust a brightness of the display based at least in part on the intensity of the at least one source of light in the environment.

11. The system of claim 5, wherein, to identify the relative position of the at least one source of light in the environment with respect to the at least one surface area in the environment, the at least one computing device is further configured to capture a distribution of lighting in the environment.

12. The system of claim 5, wherein the at least one computing device is further configured to:
   track movement of the at least one computing device; and
   adjust the color on the display based at least in part on the movement.

13. The system of claim 5, wherein the at least one computing device is further configured to determine a viewing angle of a viewer with respect to the at least one surface area in the image.

14. The system of claim 13, wherein the at least one computing device is further configured to adjust the color on the display based at least in part on the viewing angle.

15. A method, comprising:
   capturing, using at least one sensor of at least one computing device, an image of an environment, at least one surface area in the image corresponding to at least one surface area in the environment;
   capturing, using the at least one sensor of the at least one computing device, a distribution of lighting in the environment;
   determining, using the at least one sensor of the at least one computing device, a viewing angle of a viewer with respect to the at least one surface area in the image;
   displaying, by the at least one computing device, the image on a display; and
   rendering, by the at least one computing device, color on the display for the at least one surface area in the image based at least in part on the distribution of lighting, the viewing angle, and a bidirectional reflectance distribution function (BRDF) associated with the color.

16. The method of claim 15, wherein rendering the color for the at least one surface area in the image on the display further comprises rendering, by the at least one computing device, the color by applying a weighting factor to at least one color component in a color model for the display.

17. The method of claim 15, further comprising:
tracking, by the at least one computing device, movement of the at least one computing device; and
adjusting, by the at least one computing device, the color on the display based at least in part on the movement.

18. The method of claim 15, wherein capturing the distribution of lighting in the environment further comprises identifying, by the at least one computing device, a relative position of at least one source of light in the environment with respect to the at least one surface area in the environment.

19. The method of claim 18, wherein capturing the distribution of lighting in the environment further comprises:
gauging, by the at least one computing device, an intensity of the at least one source of light in the environment; and
gauging, by the at least one computing device, a color of the at least one source of light in the environment.

20. The method of claim 19, further comprising rendering the color on the display for the at least one surface area in the image based at least further in part on the intensity and the color of the at least one source of light in the environment.

* * * * *